United States Patent
Schnizlein et al.

(10) Patent No.: US 6,259,709 B1
(45) Date of Patent: Jul. 10, 2001

(54) TRAINING PREAMBLE ADDED TO CT2 MUXES IN A CT2 WIRELESS TELECOMMUNICATIONS SYSTEM

(75) Inventors: Paul G. Schnizlein; Javier V. Magana; James J. Covell, all of Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 08/850,852

(22) Filed: May 2, 1997

(51) Int. Cl.[7] ............................................. H04J 3/06
(52) U.S. Cl. .................................... 370/509; 370/520
(58) Field of Search ............................ 370/314, 321, 370/322, 337, 345, 350, 524, 520, 528, 537, 535, 509, 513, 514; 455/465, 502, 517, 557

(56) References Cited

U.S. PATENT DOCUMENTS

| | | | | |
|---|---|---|---|---|
| 5,228,037 | * | 7/1993 | Yonehara | 370/509 |
| 5,303,270 | * | 4/1994 | Fujii | 370/509 |
| 5,384,828 | * | 1/1995 | Brown et al. | 455/463 |
| 5,463,351 | * | 10/1995 | Marko et al. | 375/376 |
| 5,555,287 | * | 9/1996 | Gulick et al. | 455/557 |
| 5,557,614 | * | 9/1996 | Sandler et al. | 370/509 |
| 5,638,405 | * | 6/1997 | Hendrickson et al. | 375/298 |
| 5,671,227 | * | 9/1997 | Keller et al. | 370/513 |
| 5,790,833 | * | 8/1998 | Gulick et al. | 375/500 |

* cited by examiner

*Primary Examiner*—Chau Nguyen
*Assistant Examiner*—Chiho Andrew Lee
(74) *Attorney, Agent, or Firm*—Skjerven Morrill MacPherson LLP

(57) ABSTRACT

Described herein is a system and method of disabling D bits in a CT2 MUX signaling channel. When the bit count equals the bit location of where the D bits are typically located in the signaling channel of a CT2 MUX, circuitry of the present invention disables a D bit enable signal from being processed. The D bit enable signal would typically allow a transmitter and receiver to, respectively, send a bit as a D bit, or process a received bit as a D bit. The suffix of the CT2 MUX, consisting of D bits, is unaffected by the present invention.

9 Claims, 3 Drawing Sheets

TRAINING PREAMBLE ADDED TO CT2 MUXES IN A CT2 WIRELESS TELECOMMUNICATIONS SYSTEM

BACKGROUND OF THE INVENTION

1. Field of the Invention

This invention relates to Time Division Multiple (TDM), or Time Division Duplex (TDD), communication systems which utilize the CT2 standard (European Telecommunication Standard I-ETS, "Radio Equipment and System (RES); Common air interface specification to be used for the interworking between cordless telephone apparatus in the frequency band 864, 1 MHz, including public access service," November 1994) in particular. More particularly, this invention relates to a way of modifying a CT2 system to include "training" bits in the field normally reserved for the signaling channel of a TDM transmission or mux.

2. Discussion of Related Technology

The use of training bits is well known in the wireless communications art as a way to bring several aspects of a receiver to a steady state so information bits can be received correctly. In a TDM system, a gap of time typically occurs between one transmission burst and the next. For several reasons, a receiver may not be able to recall the exact parameters it used to receive the previous transmission burst, or, some parameters may have changed in the interim. For example, one parameter used is the slicing voltage level, i.e., that voltage above which is interpreted as a logic "1"and below which it is interpreted as a logic "0". It is common to turn power to the receiver off when it is not receiving and restore power when it is time to receive again. Although, this power management scheme reduces power consumption, it produces transients that disturb the receiver parameters. A receiver typically uses the first few bits, commonly known as "training" bits, to re-acquire these parameters to enable correct reception of the information bits.

Multiplex 2, Multiplex 1.2 and Multiplex 1.4 implemented by the CT2 standard, commonly referred to as MUX 2, MUX 1.2 and MUX 1.4 respectively, do not include the use of training bits. When the receiver is turned back on after the off power gap time, the first 16 bits (MUX 2), or the first bit (MUX 1.2), or the first two bits (MUX 1.4) convey the signaling channel and must be received correctly to avoid disrupting the communication channel. This adds difficulty to designing a TDD system based on the CT2 standard and can add undue cost to the radio demodulator design, since the signaling channel is used by a base station and handset, for example, to ascertain the status of the communication link and in communication exchange. If the signaling channel cannot be received due to errors, then this forces a link re-establishment to occur. If errors persist, the link is never established.

SUMMARY OF THE INVENTION

The present invention implements a scheme which not only allows a wireless communications receiver to stabilize between one transmission burst and the next so that no data is lost, but it also repositions the signaling channel to the end of the burst where conditions are fairly stable and therefore, errors in the signaling channel are minimal. The three commonly used MUXes of a CT2 wireless communication system, namely MUX 1.2, MUX 1.4 and MUX 2, are typically preceded by a signaling channel consisting of D channel bits. The present invention determines when these D bits are received for each of their respective MUXes and prevents a wireless receiver from receiving the bits as D bits, and prevents a wireless transmitter from transmitting them as D bits. During the time when the D bits would normally be in the signaling channel field of the MUX message, "training" bits are instead inserted. The training bits are typically an alternating pattern of bits, such as a 1010 or 0101 pattern and are usually referred to by those in the art as a "preamble field." The D bit suffix on the respective MUXes is not affected by the present invention and remains a part of the MUX message.

It is an object of the present invention to modify wireless communications CT2 circuitry so training bits are included in the serial data stream to ensure reliable reception of the signaling channel. The advantage is to simplify the design of the radio receiver to reduce its cost and to increase the assurance of acquisition of the transmission parameters for the receiver.

DETAILED DESCRIPTION OF THE PREFERRED EMBODIMENTS

Figure 1:
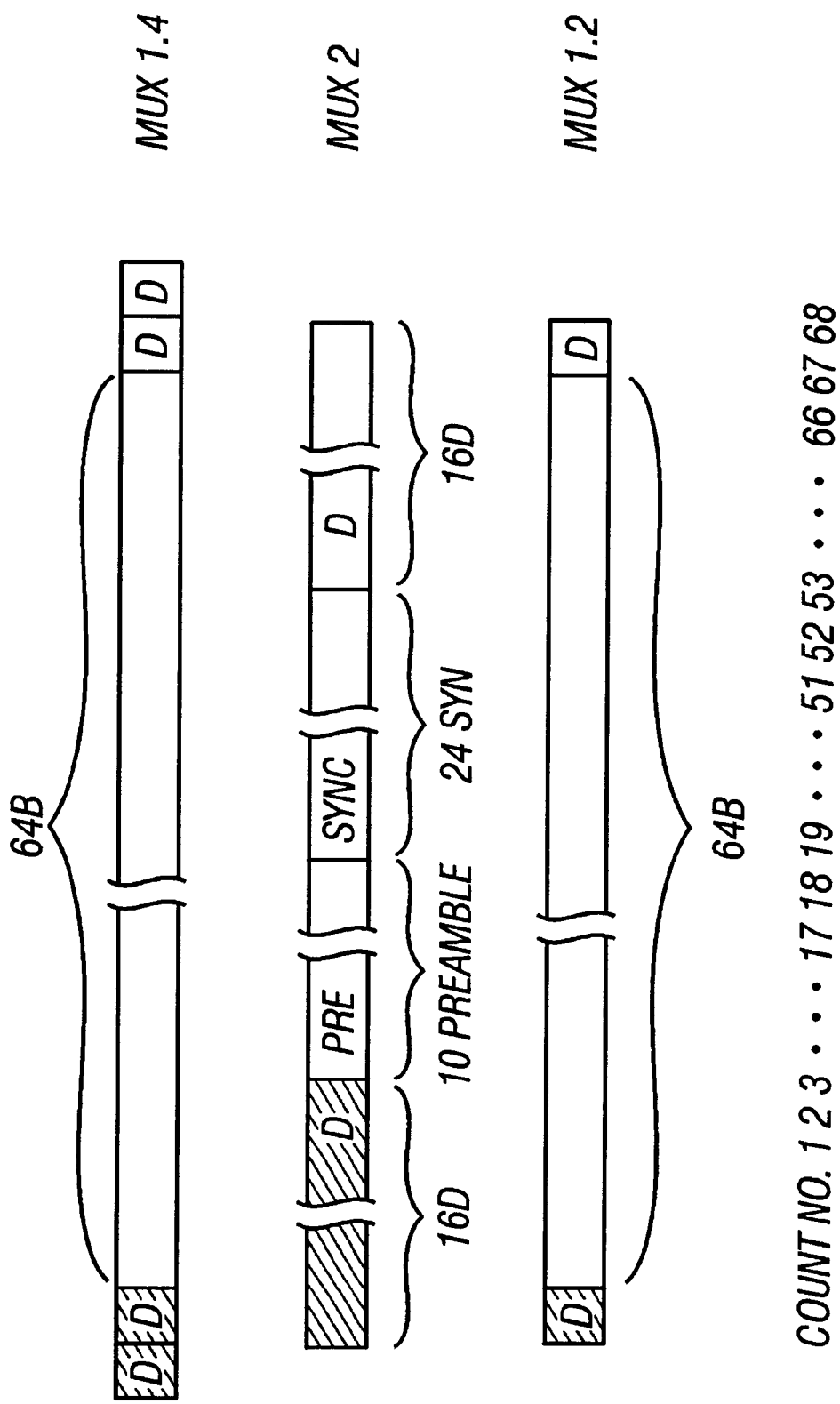
FIG. 1 schematically depicts the organization of a MUX 2, MUX 1.4 and MUX 1.2 data scheme for a CT 2 wireless communication system.

FIG. 1 shows the organization of some CT2 "MUXes", as they are called. A MUX in this instance defines the composition of serial bits being transmitted over a radio channel, for a given time or count. Generally, a CT2 link, which is a full duplex communication path between a remote wireless unit, typically a wireless telephone, and a base station, begins with a MUX 2 transmission, which synchronizes the link, then progresses to a MUX 1.2 or 1.4 protocol, depending on the result of the negotiation between the remote unit and the base unit. The voice data information is carried in the B channel bits. Each bit transmitted in the CT2 physical layer is assigned a reference count number, from 1 to 68, shown in FIG. 1. Control signaling information is carried in the D channel in all three MUXes, shown in FIG. 1 as the first and last bits in each MUX. The present invention converts the first bits, shown as shaded in FIG. 1, to training bits instead of D channel bits. The D bits located at the end of each MUX are not used in the present scheme described herein as training bits, so the D channel can still carry signaling information, albeit at half the bit rate.

Figure 2:
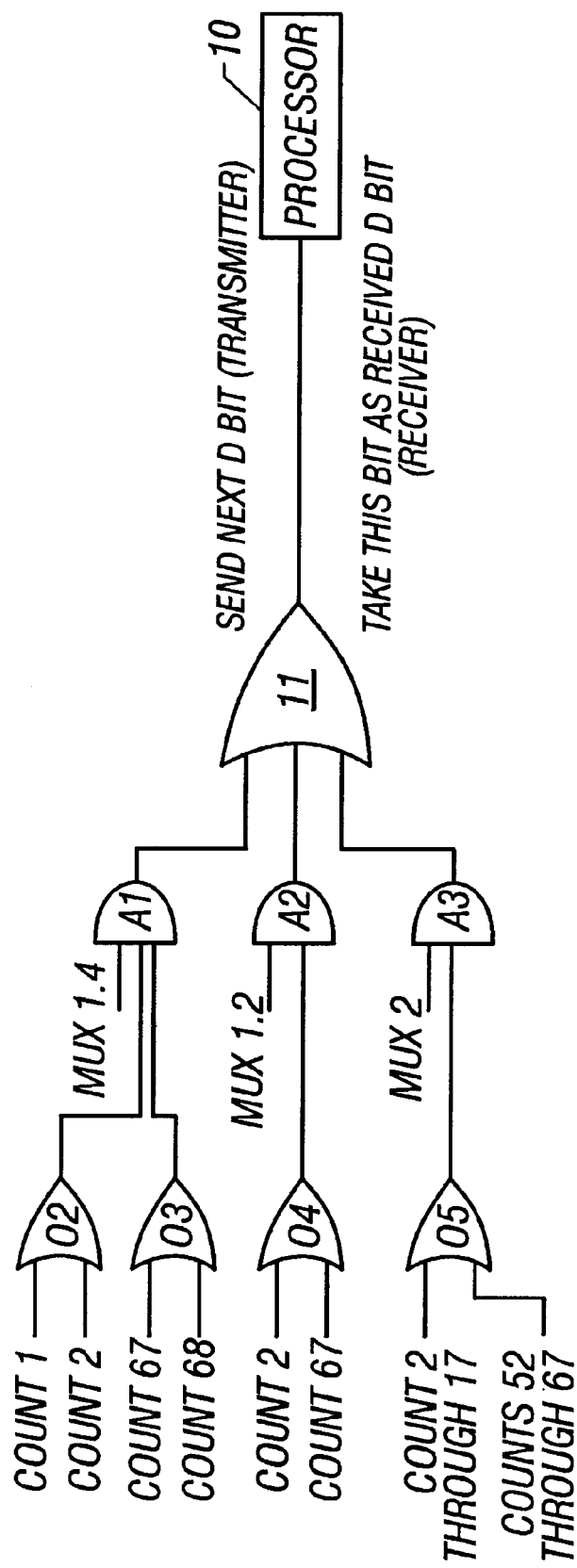
FIG. 2 illustrates a logic diagram of a bit count decode circuit of the prior art.

Typically, a section of a CT2 burst formatter is devoted to D channel processing. That section will serialize and de-serialize, calculate CRC and parity, and insert them in the proper locations. The decoding of the bit reference number, being dependent on the count, and shown in FIG. 2, is modified. FIG. 2 depicts typical CT2 D channel decoding. Each bit number identified to contain D channel data is decoded separately for each MUX via OR gates 2–5. The decode signals are then provided to the three input OR gate 11. The output of the OR gate 11 is provided to the D channel processing section of data processor 10. Such a processor is known in the art. On the transmit side, the output of OR gate 11 signifies, "time to give the next D channel bit". On the receive side, it signifies, "take the present bit and interpret it as a D channel bit." The scheme of FIG. 2 is known in the art.

Figure 3:
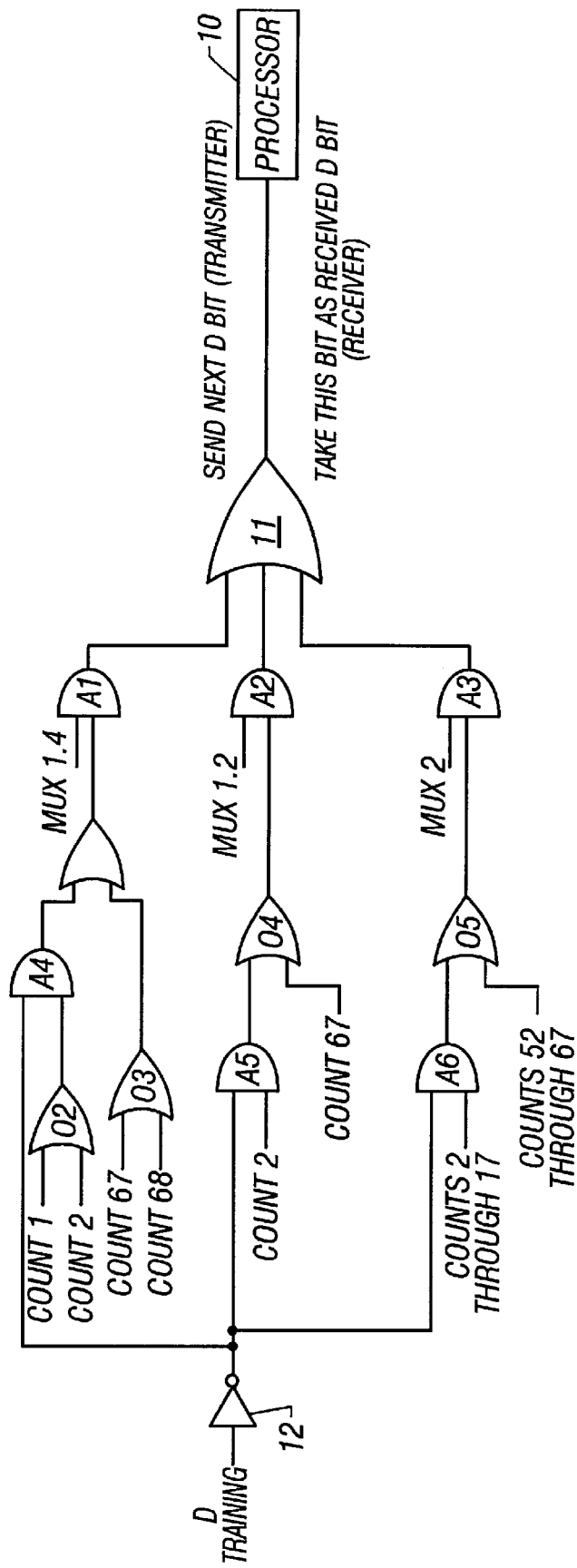
FIG. 3 schematically depicts an embodiment of the training bit insertion scheme of the present invention.

FIG. 3 illustrates the preferred embodiment of the present invention. When the training bit insertion feature is to be utilized, the input signal "D TRAINING" is true, and the output of the inverter 12 is false. This logical false is provided to AND gates A4, A5, and A6. This in turn prevents the decoded counts that occur near the beginning of the frame (i.e. counts 1 and 2) from allowing the signal output from OR gate 11 to be provided to the processor 10, or other circuitry to initialize the D bits at the beginning of the MUX. In this way, the "D training" signal inhibits the D channel processing section of processor 10, or other circuitry, from interpreting those early count bits as D channel bits. AND gate A5 performs this blocking function for MUX 1.2 operation. AND gate A6 performs this blocking function for MUX 2 operation and gate A4 performs this blocking function for MUX 1.4 operation. This gating scheme effectively changes the shaded D channel bits, shown in FIG. 1, into training bits. Thus, the decoding of the early counts inhibits the placement of D bits in the beginning of the MUX pattern. The D bits at the conclusion of the MUX are not affected.

Additionally, since the processor 10 is not supplying the D bits during this training time, a pattern alternating as 1010, for example, is sent during this time to help stabilize the receiver. It is known in the art how to take these decoded bit times and program the transmitter to send a pattern of alternating bits during the counts where D bits are blocked and training bits are inserted.

The foregoing disclosure and description of the invention and examples provided are illustrative and explanatory of the preferred embodiments. Changes in the size, shape, materials, elements and individual components used, and the connections made, may be made without departing from the spirit and scope of the inventions herein claimed.

What is claimed is:

1. A method of disabling D bits in a CT2 MUX preamble, comprising the steps of:

a) providing a serial input signal representing signaling information;

b) detecting a first prespecified bit count of said input signal;

c) detecting a second prespecified bit count of said input signal; and d) providing a D bit enable signal when said second prespecified bit count is detected and disabling said D bit enable signal when said first prespecified bit count is detected.

2. The method of claim 1, further comprising the step of providing a data processor, wherein said D bit enable signal is provided to said data processor.

3. The method of claim 1, further comprising the step of processing a D bit for transmission when said second prespecified bit count is detected.

4. The method of claim 1, further comprising the step of processing a received D bit when said second prespecified bit count is detected.

5. The method of claim 1, wherein said serial input signal is a MUX 2 message.

6. The method of claim 1, wherein said serial input signal is a MUX 1.2 message.

7. The method of claim 1, wherein said serial input signal is a MUX 1.4 message.

8. A D bit disabling circuit for a CT2 communication system, comprising:

a) a training bit enable signal;

b) a bit count signal;

c) a first prespecified bit count detection circuit; and d) a second prespecified bit count detection circuit;

wherein said training bit enable signal and said bit count signal are provided to said detection circuits; and wherein when said bit count signal indicates a second prespecified bit count, a D bit enable signal is generated by said second prespecified bit count detection circuit.

9. The circuit of claim 8, further comprising a data processor which receives said D bit enable signal.

* * * * *